G. F. SHAPLAND.
COOKING ATTACHMENT FOR STOVES.
APPLICATION FILED FEB. 8, 1915.
1,155,519.
Patented Oct. 5, 1915.
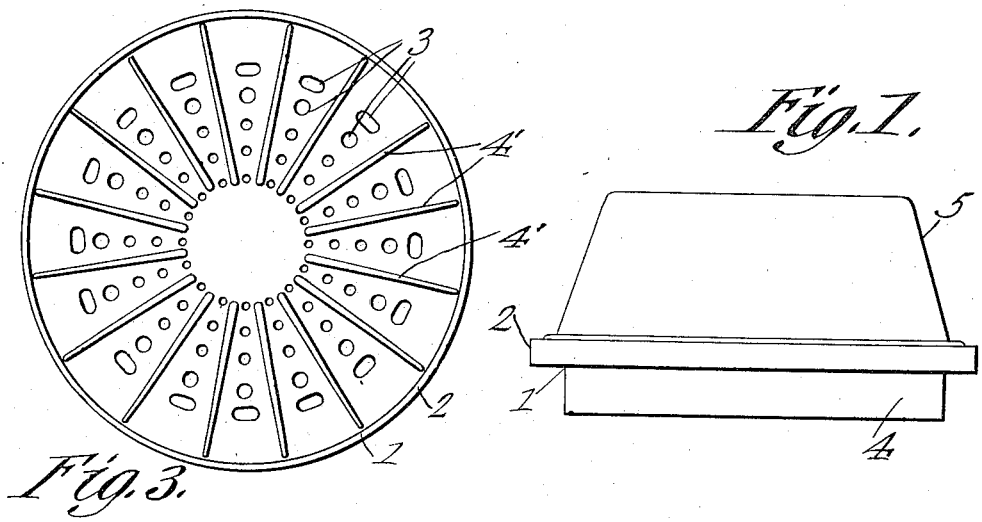
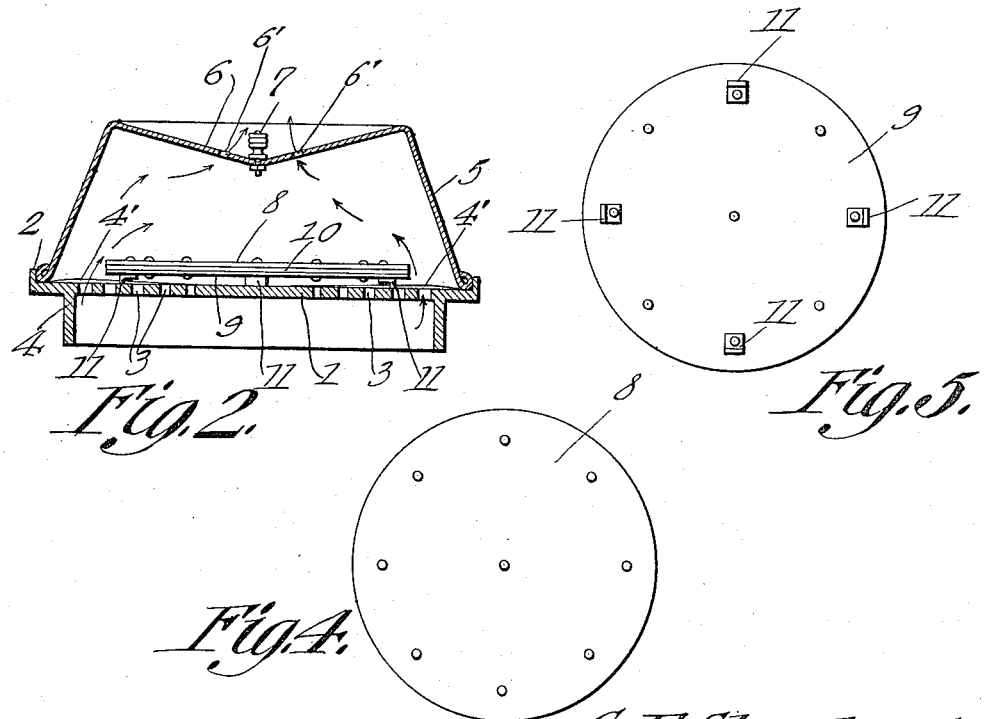
G. F. Shapland
Inventor

UNITED STATES PATENT OFFICE.

GEORGE F. SHAPLAND, OF SALINA, KANSAS.

COOKING ATTACHMENT FOR STOVES.

1,155,519.  Specification of Letters Patent.  Patented Oct. 5, 1915.

Application filed February 8, 1915. Serial No. 6,829.

*To all whom it may concern:*

Be it known that I, GEORGE F. SHAPLAND, a citizen of the United States, residing at Salina, in the county of Saline and State of Kansas, have invented a new and useful Cooking Attachment for Stoves, of which the following is a specification.

This invention relates to a cooking attachment for stoves, one of its objects being to provide a light, durable and inexpensive device of this character which can be used as a small oven and which can also be employed as a means for holding saucepans or other utensils.

Another object is to provide a device of this character having a novel form of heat spreader whereby the utensils placed upon the attachment are prevented from being overheated at the bottoms thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings, Figure 1 is a side elevation of the attachment. Fig. 2 is a vertical longitudinal section therethrough. Fig. 3 is a plan view with the cover removed. Fig. 4 is a plan view of the heat spreader. Fig. 5 is a bottom plan view of the heat spreader.

Referring to the figures by characters of reference 1 designates a base plate preferably circular and provided with an upstanding concentric rib 2, there being radially disposed series of apertures 3 within the base plate and surrounded by the rib, the apertures of each series gradually increasing in size toward the rib. The middle portion of the plate is imperforate and a circular flange 4 extends downwardly from the plate and below the rib, this flange being concentric with the plate and constituting means for engaging the top of a stove for the purpose of supporting the plate 1 above a flame. Ribs 40 are formed on the top face of plate 1 and radiate from the center thereof.

A frusto-conical hood or cover 5 is mounted on the plate 1 and is so proportioned as to fit within the space surrounded by the rib 2, this rib thus operating to hold the cover or hood against horizontal displacement. The top of the hood or cover 5 is depressed, as shown at 6, and has a handle or knob 7 located wholly below the upper end of the hood so that it is thus possible to place a utensil on the hood or cover to heat it while the cover or hood is in position on the base plate 1. Openings 6' are formed in the hood for the escape of heat.

For the purpose of spreading heat and at the same time protecting the bottoms of utensils from overheating, a spreading disk is removably mounted on the base plate 1, this disk including upper and lower circular plates 8 and 9 respectively and an interposed circular piece of asbestos indicated at 10, the plates being riveted or otherwise secured upon opposite faces of the asbestos. Furthermore, the bottom plate has supporting ears or legs 11 secured to it at desired intervals, these legs being adapted to rest upon the plate 1.

In using the attachment the same is placed over a flame so that the heat will rise through the openings 3. The heat spreader is placed on the plate 1 so as to cause the hot gases to flow radially under the spreader. By placing a pan or other utensil on the spreader and then placing the hood or cover 5 in position on the base plate, the contents of the utensil will be cooked in the same manner as in an ordinary oven. By removing the hood or cover and the spreader, saucepans or the like can be placed directly on the plate 1 and will be supported by the ribs 4. By utilizing the heat spreader, the flames and hot gases are prevented from coming in direct contact with the center of the bottom of the utensil and burning it. Instead they are spread laterally and more thorough cooking of the contents of the utensil is thus effected than would be possible otherwise.

A cooking attachment such as herein described has been found to constitute an efficient oven especially in baking pies, pans of rolls and the like.

What is claimed is:—

A cooking attachment for stoves, including a base plate having an upstanding marginal rib and a depending circular supporting flange, there being radially disposed ribs upon the upper face of the plate, each rib gradually increasing in height from its ends toward an intermediate point, a hood removably seated on the base plate and bearing outwardly at its lower edge against the marginal rib, said hood having a depressed top, a handle connected to the depressed top and having its uppermost portion located below the uppermost portion of the hood, said hood having outlet openings in said depressed top, and heat spreading means detachably mounted on the base plate and under the hood and including upper and lower plates, an interposed thickness of insulating material secured to the plates, and legs depending from the lower plate and detachably bearing upon the base plate and between certain of the radial ribs, there being radial series of openings within the base plate and between the radial ribs, the said openings increasing in width toward the periphery of the base plate.

In testimony that I claim the foregoing as my own, I have hereto affixed my signature in the presence of two witnesses.

GEORGE F. SHAPLAND.

Witnesses:
RAYMUND C. GEBHART,
ELMO T. O. WELCH.

Copies of this patent may be obtained for five cents each, by addressing the "Commissioner of Patents, Washington, D. C."